United States Patent [19]

Melin et al.

[11] 4,401,463
[45] Aug. 30, 1983

[54] PROCESS FOR THE RECOVERY OF METALS FROM THE SCRAP FROM NICKEL-CADMIUM ELECTRIC STORAGE BATTERIES

[75] Inventors: Åke L. Melin; Vide H. Svensson, both of Oskarshamn, Sweden

[73] Assignee: SAB Nife AB, Landskrona, Sweden

[21] Appl. No.: 420,922

[22] Filed: Sep. 21, 1982

[30] Foreign Application Priority Data

Sep. 24, 1981 [SE] Sweden .............................. 8105661

[51] Int. Cl.$^3$ .............................................. C22B 7/00
[52] U.S. Cl. ...................................... 75/44 S; 75/63; 75/71; 75/82
[58] Field of Search ...................... 75/71, 63, 82, 44 S

[56] References Cited

FOREIGN PATENT DOCUMENTS

| 853126 | 10/1970 | Canada | 75/44 S |
|---|---|---|---|
| 2014102 | 5/1969 | France | 75/71 |
| 55-152138 | 11/1980 | Japan | 75/71 |

*Primary Examiner*—M. J. Andrews
*Attorney, Agent, or Firm*—Laurence R. Brown

[57] ABSTRACT

The present invention relates to a process for the recovery of metals from the scrap from nickel-cadmium electric storage batteries or other products which in addition to cadmium also contain organic substances and metallic components made of iron, nickel or other metals. The process involves opening the batteries and emptying them of any free electrolyte, drying the scrap, removing the organic substances by pyrolysis at an initial temperature followed by condensation. The pyrolysis and distilling-off operations are performed in one and the same furnace by the successive and preprogrammed raising of the temperature inside the furnace, for example in stages, in order to produce a residue inside the furnace in the form of nickel and iron scrap.

Pyrolysis takes place in a controlled atmosphere, requiring the introduction of an inert gas such as nitrogen with the addition of between 3 and 12% of oxygen, if necessary in the form of air. Pyrolysis is made to occur by raising the temperature inside the furnace from about 100° C. to an initial temperature of about 400° C. or 500° C. The vaporization of the cadmium takes place at a second temperature of up to about 900° C. in the presence of a reducing protective gas. The cadmium vapor is condensed and the liquid metal is cast into cadmium rods.

10 Claims, 1 Drawing Figure

U.S. Patent
Aug. 30, 1983
4,401,463
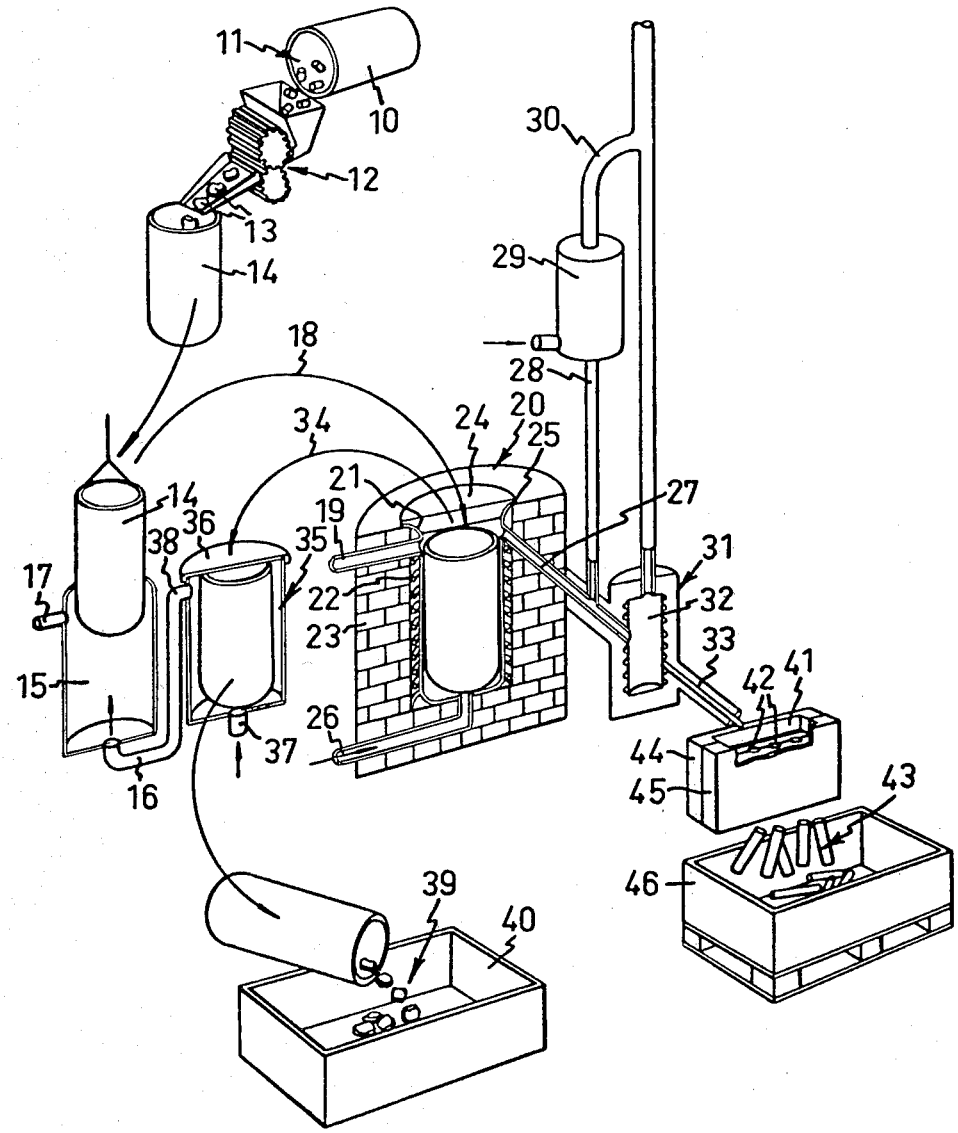

PROCESS FOR THE RECOVERY OF METALS FROM THE SCRAP FROM NICKEL-CADMIUM ELECTRIC STORAGE BATTERIES

TECHNICAL FIELD

The present invention relates to a process for the recovery of metals from the scrap from nickel-cadmium electric storage batteries which also contain organic substances and iron components. The metals are present principally in the form of nickel, iron and cadmium. However, the invention is also applicable to scrap containing other metals.

BACKGROUND ART

Used electrical storage batteries contain metals whose recovery may be advantageous from the financial point of view. The metals which are principally of interest are cadmium and nickel. There is additional environmental interest in preventing cadmium, for instance, from being released into the environment by the arbitrary and indiscriminate scrapping or throwing away of batteries. From various viewpoints, therefore, there is a significant desire to ensure that used and scraped batteries are dealt with in a controlled and safe manner.

It has not previously been possible to recover metals from scrapped, sealed nickel-cadmium batteries because of the complicated and costly disassembly work involved.

THE INVENTION

The present invention enables recovery to take place in an extremely satisfactory manner from the point of view of occupational safety and health; the organic substances are removed effectively, cadmium of high purity is obtained in liquid form and is then cast, and the iron-nickel scrap is produced either in the form of high-grade scrap or fused and cast into ingots.

The aim of the present invention is achieved by opening or puncturing the batteries and emptying them of any free electrolyte, drying the scrap, removing the organic substances by pyrolysis at an initial temperature and distilling-off the cadmium by vaporization at the second temperature followed by condensation, whereby the pyrolysis and distilling-off operations are performed in one and the same furnace by the successive and preprogrammed raising of the temperature inside the furnace, for example in stages, in order to produce a residue inside the furnace in the form of a mixture of nickel and iron scrap.

It has been found to be particularly advantageous during pyrolysis to introduce an oxidizing controlled atmosphere consisting of an inert gas, such as nitrogen, with the addition of between 3 and 12% of oxygen, said oxygen gas possibly being supplied in the form of air.

In order to achieve a gentle decomposition of the organic substances, it has been found to be advantageous if pyrolysis takes place by raising the temperature inside the furnace from a temperature of about 100° C. to an initial temperature of about 400° C., which will be adequate for the majority of plastics, or to about 500° C. if the organic material contains a plastic of the the high temperature resistant type. In order to distill-off the cadmium, vaporization of the cadmium is made to occur at a second temperature of up to about 900° C. in the presence of a reducing controlled atmosphere, and the resulting cadmium vapour is condensed and the liquid metal is cast into cadmium rods.

It is advantageous in this respect to use hydrogen gas or a mixture of hydrogen gas and nitrogen gas as the reducing controlled atmosphere, excellent economy being achievable by circulating the reducing controlled atmosphere within a sealed system.

The process can be further developed by fusing together nickel and iron in the same furnace used for the pyrolysis and distilling-off operations, at a temperature of about 1300° C. for melting the iron-nickel scrap and by casting it into ingots.

It is also appropriate in conjunction with this process to open the batteries by perforation or by tearing apart between toothed rollers.

THE DRAWING

The present invention is described in greater detail with reference to the attached drawing, which shows an installation for carrying out the process, which may be applied to sealed electrical cells containing cadmium and nickel together with iron components. Batteries of this type are used, for example, in dictaphones, in recording and play-back apparatus, in radio and television receivers, in clocks and in electronic calculators, etc. The invention is now described in greater detail with reference to the attached drawing.

DETAILED DESCRIPTION OF A PREFERRED EMBODIMENT

The FIGURE shows a perspective view of an installation in which the process may be carried out. The installation is used for the recovery of material from sealed cells for electric storage batteries. Scrap sealed cells 11 are fed into the installation in drums 10. The cells are punctured or are disassembled in an appropriate manner, for example with the help of a crushing mill 12 with toothed rollers, in order to open the cells. The opened cells 13 are then fed via a channel into a basket or container 14, which is moved with its contents through the different stages of the process. Once the container 14 is full of material it is placed in a hot blast furnace 15. The material in the basket 14 is cold and, as a rule, also damp. The hot blast furnace 15 contains the outlet for a pipe 16 for hot air, which is produced in the manner described below. The hot air flows through the basket, and the material is heated at the same time as the moisture is expelled by the hot air which, after it has been made to flow through the basket, is ducted away to a dust filter, e.g. a bag filter, via an outlet 17. The basket and the material are then moved by means of a suitable coveyor device 18, for example an overhead crane, to the pyrolysis and distillation furnace 20. The distillation furnace has a refractory brick lining 21 surrounded by heating elements 22 and with a fireproof furnace lining 23 on the outside. The opening of distillation furnace is covered by a furnace lid 24 along the edge of which is arranged a gas-tight seal 25.

After the material has been heated in the hot blast furnace 15 and after it has been transported to the distillation furnace 20, the lid 24 is placed on the furnace, which is then heated. The increase in the temperature is preprogrammed and is controlled by a programming device, a computer or some other similar and previously disclosed arrangement. Once the increase in the temperature has begun, an oxidizing controlled atmosphere is introduced into the pyrolysis and distillation furnace 20 via an inlet pipe 26 and is passed through the basket 14. In order to ensure acceptable contact between the material in the basket and the controlled atmosphere, the basket 14 is provided with solid walls and a solid base in which a central hole with an inward-facing collar has been formed. The controlled atmosphere flows through the furnace and exits from it via an outlet pipe 27, which has its opening directly below the furnace lid 24. The oxidizing controlled atmosphere is in the form of an inert gas, for example nitrogen, to which oxygen gas is added either in its pure form or in the form of air.

The pre-programmed increase in the temperature first proceeds as far as an initial temperature, this being the pyrolysis temperature, at which pyrolysis of the organic substances present in the opened cells 13 takes place, e.g. plastics and rubber. The temperature is initially increased relatively gently from about 100° C. in order to ensure the gradual decomposition of the organic substances.

The controlled atmosphere will prevent the ignition of the pyrolysis gases in the pyrolysis furnace 20. The pyrolysis temperature required is about 400° C. in the case of the pyrolysis of, for example, rubber and ordinary plastics, although the temperature must be increased to about 500° C. if the plastics are in the higher temperature form. Because cadmium will sublimate at between 350° and 400° C., between 3 and 12% of oxygen is added to the controlled atmosphere. The addition of the oxygen will prevent sublimation, although the cadmium will be oxidized. In order to achieve this situation, the concentration of the oxygen must not be allowed to fall below the lower limit. However, in order to prevent the ignition and combustion of pyrolysis gases in the furnace, the oxygen concentration must be kept below the specified maximum limit. Thus, during this phase of the process, pyrolysis of the organic substances will take place, but cadmium will not be lost.

Any pyrolysis gases which are formed are led away from the pyrolysis furnace via the outlet pipes 27 and 28 to a combustion device 29 in which the pyrolysis gases are burnt off, which calls for a high temperature of about 900° C. For the purpose of heating and burning off the pyrolysis gases in the combustion device, especially at the beginning and end of the pyrolysis process when the gases are being generated at a low level, liquified petroleum gas and air are fed to a ring burner, causing the combustion of the pyrolysis gases with water and carbon dioxide as the principal products of combustion. If the plastic material contains PVC, then other combustion products such as hydrogen chloride or hydrogen fluoride will be formed. The combustion gases are led via an outlet pipe 30 to a collecting pipe which collects the various exhaust gases together and leads them to a cleaning device, for example in the form of a Venturi scrubber, where any impurities are removed. Any hydrogen chloride and/or hydrogen fluoride which is formed may be effectively removed in the Venturi scrubber by the use of alkaline water.

Once pyrolysis is complete, the temperature of the pyrolysis and distillation furnace is then raised to the second temperature, this being the temperature at which cadmium is distilled-off.

At the same time as the temperature begins to increase, the nature of the controlled atmosphere is changed from being an oxidizing gas to being a reducing gas. The reducing controlled atmosphere consists of nitrogen and hydrogen and will cause the cadmium oxide to be reduced to metallic cadmium.

Alternatively, the controlled atmosphere may leave the furnace 20 via an outlet pipe 19 and may be led through a circulation pipe to be reintroduced into the furnace via the inlet pipe 26.

Distilling-off will occur whilst the temperature is increasing and at the distilling-off temperature. The metal vapours are condensed in the outlet pipe 27 and are led into a holding vessel 31 with a heated container 32, which is kept by means of temperature control at a temperature such that the distilled cadmium metal is in a liquid form and suitable for casting.

The basket 14 is kept in the distillation furnace 20 for a sufficient period to ensure that all the cadmium is driven off. The length of the period will depend on the size of the charge and the temperature used. This can be appreciated in more detail from the example described below. Once the process in the distillation furnace is compete, the basket 14 is moved by means of a transport device 34 to a container 35 with a sealed lid 36. An air inlet pipe 37 is present at the base of the container 35. The inlet pipe passes through the same tubular collar in the basket 14 as was used to accept the inlet pipe 26 when the basket was placed in the distillation furnace 20. Air is now blown through the hot basket 14 and is exhausted via an outlet pipe 38 at the top of the container 35. The air which has thus been heated is led to the inlet 16 of the hot blast furnace 15 where the hot air is used in the manner already described above. Energy is saved by the recovery of heat in this way.

Once the temperature of the basket 14 and of the container 35 has fallen to a sufficiently low level, the basket is moved by means of a transport device from the container 35, and any residue 39 from the distillation process remaining in the basket and which is in the form of nickel-iron scrap, is tipped into a scrap container 40.

The molten cadmium metal is tapped from the heated container 32 via an insulated pipe 33 and into a cooled casting tool which consists of two mould halves 44 and 45. The molten cadmium metal flows into a depression 41 in the upper part of the casting tool and from there down into cylindrical mould cavities 42 located at the parting line between the mould halves 44 and 45. Once all the mould cavities have been filled, the mould halves 44 and 45 are separated and the cast cadmium rods 43 are collected in a container 46.

EXAMPLE

Approximately 1000 kg of scrap, sealed nickel-cadmium electric storage batteries, crushed in a mill (12) with toothed rollers, were tipped into a basket (14) which was placed in a heating furnace (15) for the purpose of driving off any moisture for about 10 hours, whereupon the basket (14) was moved to a pyrolysis and distillation furnace (20).

The initial temperature of the furnace was about 50° C. An oxidizing controlled atmosphere consisting of nitrogen containing 5% by volume of oxygen was introduced via the base of the pyrolysis furnace and was allowed to flow through the basket. The temperature was increased so as to reach about 315° C. after 2 hours from starting up. The temperature was then further increased, generally speaking in a continuous fashion, until a temperature of 420° C. was reached after 12 hours from starting up. This temperature was maintained for a further 12 hours. Thus a total of 24 hours were required for the pyrolysis operation.

The pyrolysis gases were led from the retort to a combustion device (29) with an LPG ring burner which was regulated in such a way that the temperature in the combustion device was 900° C. The burnt pyrolysis gases, consisting principally of water and carbon dioxide, were led to a Venturi scrubber for cleaning.

At the end of the pyrolysis process, the oxidizing controlled atmosphere was replaced by a reducing controlled atmosphere consisting of nitrogen and hydrogen. In order to distill-off the cadmium, the temperature was further increased in such a way that it was 750° C. after 5 hours, 820° C. after 9 hours and 885° C. after 15 hours, whereupon no further increase took place. The temperature was increased from 820° C. to 885° C. in order to drive off the last residues of cadmium. Cadmium was distilled-off in this way, was condensed in the condenser, and was stored in liquid form in the holding vessel (32), which was kept at a temperature of 450° C. Once an adequate quantity of cadmium had been collected in the holding vessel, this was tapped off.

After a further 5 hours, i.e. a total of 20 hours calculated from the end of the pyrolysis phase, the basket had cooled to about 600° C. It was then transferred to a heat recycling container (36), through which air was blown and heated and was then led via a pipe (38, 16) to the hot blast furnace (15). After the basket (14) had been cooled, its contents were tipped into a scrap bin. An analysis of the scrap showed the level of residual cadmium to be less than 0.01%.

The present invention is applicable to the recovery of metal from the cadmium-containing electrode plates of alkaline batteries, even if they contain a certain proportion of organic substances.

The major proportion of the time required to complete a process cycle in accordance with the idea of invention is accounted for by the pyrolysis and distillation phases. Accordingly, several pyrolysis/distillation furnaces may be used in conjunction with only a single heat recycling vessel 35, a single hot blast furnace 15, a single holding vessel 31 and a single combustion device 29, etc.

It will be obvious to an expert that the present invention may also be used for the pyrolysis and recovery of other products containing, for example, cadmium together with organic substances, and that this may take place in an extremely satisfactory fashion from the environmental point of view.

We claim:

1. A process for the recovery of metals in a furnace from the scrap from nickel-cadmium electric storage batteries which in addition to nickel and cadmium also contain organic substances and iron components, characterized in the steps of
    (a) opening the batteries and emptying them of their free electrolyte;
    (b) drying the scrap obtained from step (a);
    (c) removing the organic substances from the dried scrap by pyrolysis in said furnace by establishing a predetermined temperature and introducing a controlled atmosphere in the form of an inert gas such as nitrogen with the addition of between 3 and 12% of oxygen; and
    (d) thereafter distilling off the cadmium from the organic free residue of step (c) by vaporization in said furnace in a controlled reducing gas protective atmosphere at a further higher temperature followed by condensing the vapor to obtain the cadmium,
    (e) and recovering a residue inside the furnace in the form of a mixture of nickel and iron scrap.

2. A process according to claim 1, characterized in the step of supplying oxygen in the form of air.

3. A process according to claim 1, characterized in that the operation (c) step is performed by gradually raising the temperature inside the furnace from a temperature of 100° C. to said predetermined temperature of up to 400° C.

4. A process according to claim 1, characterized in that the operation (c) step is performed by gradually raising the temperature inside the furnace from a temperature of 100° C. to said predetermined temperature of up to 500° C.

5. A process according to claim 1, characterized in that the operation (d) step includes the steps of vaporization of the cadmium, which may include cadmium oxide at said further temperature of up to 900° C. in the presence of said reducing protective gas, the condensation of the resulting cadmium vapour and the casting of the liquid cadmium metal into cadmium rods.

6. A process according to claim 5, characterized in that the hydrogen gas is used as the reducing protective gas.

7. A process according to claim 5, characterized in that a mixture of hydrogen gas and nitrogen gas is used as the reducing protective gas.

8. A process according to claim 5, characterized in that the furnace is coupled in a sealed system including the step of circulating reducing protective gas inside said sealed system.

9. A process according to claim 1 characterized in the step of fusing nickel and iron together at a temperature of about 1300° C. in the furnace for melting the iron-nickel scrap.

10. A process according to claim 1, wherein the furnace is part of a system preparing the batteries by means of toothed rollers characterized in the step of opening the batteries in operation (a) by tearing them apart between said toothed rollers.

* * * * *